United States Patent [19]
Nakane et al.

[11] Patent Number: 5,595,842
[45] Date of Patent: Jan. 21, 1997

[54] LITHIUM SECONDARY BATTERY HAVING A CATHODE CONTAINING GALLIAM

[75] Inventors: Kenji Nakane; Yasunori Nishida, both of Ibaraki-ken; Chikashi Akamatsu, Ehime-ken; Tomoari Satoh, Ibaraki-ken; Kazuyuki Tanino, Ibaraki-ken; Taketsugu Yamamoto, Ibaraki-ken, all of Japan

[73] Assignee: Sumitomo Chemical Company Limited, Osaka, Japan

[21] Appl. No.: 438,654

[22] Filed: May 9, 1995

[30] Foreign Application Priority Data

| May 10, 1994 | [JP] | Japan | 6-096294 |
| Aug. 4, 1994 | [JP] | Japan | 6-183462 |

[51] Int. Cl.$^6$ .................................................. H01M 4/52
[52] U.S. Cl. ............................................ 429/223; 429/218
[58] Field of Search ............................... 429/223, 218; H01M 4/52

[56] References Cited

U.S. PATENT DOCUMENTS 4,327,157  4/1982  Himy et al. ............................ 429/61
4,605,604  8/1986  Pollack et al. ........................ 429/116

OTHER PUBLICATIONS

Patent Abstracts of Japan, vol. 18, No. 372 (E–1577), Jul. 13, 1994.

Alternative Cathode Materials for a Molten Carbonate Fuel Cell. Kazumi et al. (1992) (month unknown) Abstract.

Primary Examiner—Stephen Kalafut
Assistant Examiner—Richard H. Lilley, Jr.
Attorney, Agent, or Firm—Sughrue, Mion, Zinn, Macpeak & Seas

[57] ABSTRACT

A lithium secondary battery that includes a cathode containing, as an active material, a material that can be doped/undoped with lithium ions; an anode containing, as an active material, a lithium metal, a lithium alloy or a material that can be doped/undoped with lithium ions; and a liquid or solid electrolyte. In this lithium secondary battery, the active material used in the cathode is lithiated nickel dioxide containing gallium. As a result, the lithium secondary battery attains excellent cycle and overcharge resistance characteristics and has a high energy density.

12 Claims, 7 Drawing Sheets

LITHIUM SECONDARY BATTERY HAVING A CATHODE CONTAINING GALLIAM

FIELD OF THE INVENTION

The present invention relates to a lithium secondary battery comprising a cathode including, as an active material, a material that can be doped/undoped with lithium ions, an anode including, as an active material, a lithium metal, a lithium alloy or a material that can be doped/undoped with lithium ions, and a liquid or solid electrolyte.

BACKGROUND OF THE INVENTION

Lithiated cobalt dioxide and lithiated nickel dioxide are compounds having a so-called $\alpha$-NaFeO$_2$ type structure, in which lithium ions are regularly arranged in a layered manner alternately with cobalt ions or nickel ions, which is arranged vertically to the closest packing layer of oxygen ions. Due to this structure, the lithium ions in a layer can diffuse comparatively easily. Hence, lithium ions can be electrochemically doped or undoped in such a compound. Various studies have been made to use these compounds as a cathode in a lithium secondary battery. Such a lithium secondary battery is expected to play an important role as a high-performance compact secondary battery, which in the future may function as a power supply for electric vehicles or as a power storage device for load leveling.

Lithiated cobalt dioxide is already used as a cathode in lithium secondary batteries that supply power to some portable telephones and video cameras. However, lithiated cobalt dioxide, which is produced from an expensive cobalt compound, is inferior to lithiated nickel dioxide, which can be produced from an inexpensive and abundant nickel compound.

However, it is difficult to synthesize lithiated nickel dioxide having a large discharge capacity, compared with lithiated cobalt dioxide, because the charging/discharging characteristic of lithiated nickel dioxide depend largely upon the synthesis method thereof. Specifically, the difficulty is that in lithiated nickel dioxide, nickel is easily substituted at lithium sites, and therefore, the resultant compound can contain substituted nickel unless the synthesis condition is appropriate. Nickel at lithium sites inhibits the diffusion of lithium ions, thereby adversely affecting the charging/discharging characteristic of the resultant lithiated nickel dioxide.

Recently, various attempts to synthesize lithiated nickel dioxide having a large discharge capacity have been made by optimizing the synthesis condition. For example, Yamada et al (The 34th Battery Symposium, Lecture No. 2A06 (1993)) reported that lithiated nickel dioxide with an Ni oxidation number of approximately 3.0 was obtained by firing a mixture of LiOH•H$_2$ and Ni(OH)$_2$ in oxygen at a temperature of 700° C.; and then a mixture of the resultant lithiated nickel dioxide, acetylene black and polytetrafluoroethylene (hereinafter referred to as PTFE) was adhered with pressure to a current collector to manufacture a cathode, in which the discharge capacity was found to be 200 mAh/g through evaluation by a constant capacity charge. They also reported that when the charge/discharge was continued to attain the discharge capacity of 200 mAh/g, the cycle characteristic was extremely poor and the lifetime was approximately ten cycles. It was also reported to be necessary to minimize the charge capacity for the constant capacity charge in order to attain excellent cycle characteristics. It was further reported that a charge capacity of 130 mAh/g or less led to a lifetime of 100 cycles or more.

Thus, lithiated nickel dioxide has poor characteristics when it is charged/discharged at a high capacity.

In addition, lithiated nickel dioxide is inferior to lithiated cobalt dioxide in energy density when used at the same capacity. This is because lithiated nickel dioxide has a lower discharging voltage, which is defined as the characteristic of the material to be used. Generally, it is effective to increase the discharging voltage, as well as the discharge capacity, in order to obtain a secondary battery with a higher energy density. However, it has been impossible to increase the discharging voltage of pure lithiated nickel dioxide.

SUMMARY OF THE INVENTION

The present inventors have conducted studies and found a lithium secondary battery that can attain high energy density and excellent cycle characteristics, even when charged/discharged at a high capacity, by using lithiated nickel dioxide containing gallium as an active material in the cathode.

The lithium secondary battery of this invention comprises a cathode, which includes, as an active material, a material that can be doped/undoped with lithium ions; an anode, which includes, as an active material, a lithium metal, a lithium alloy or a material that can be doped/undoped with lithium ions; and a liquid or solid electrolyte. In this lithium secondary battery, the active material in the cathode is lithiated nickel dioxide containing gallium.

In a preferable embodiment, the lithiated nickel dioxide containing gallium satisfies the following relationship:

$0 < x \leq 0.2$ wherein x is a molar ratio of the gallium to a total amount of the gallium and nickel contained in the lithiated nickel dioxide.

In a more preferable embodiment, the lithiated nickel dioxide containing gallium satisfies the following relationship:

$0 < x \leq 0.05$ wherein x is a molar ratio of the gallium to a total amount of the gallium and nickel contained in the lithiated nickel dioxide.

In a most preferable embodiment, the lithiated nickel dioxide containing gallium satisfies the following relationship:

$0.001 < x \leq 0.02$ wherein x is a molar ratio of the gallium to a total amount of the gallium and nickel contained in the lithiated nickel dioxide.

In one embodiment, the lithiated nickel dioxide containing gallium is obtained by firing a mixture of a lithium compound, a nickel compound, and gallium or a gallium compound.

In another embodiment, the lithiated nickel dioxide containing gallium is obtained by dispersing a nickel compound in an aqueous solution including a gallium compound and a water-soluble lithium salt, evaporating the water content of the resultant solution to obtain a mixture, and firing the mixture in an atmosphere containing oxygen.

In still another embodiment, the gallium compound is gallium nitrate, the water-soluble lithium salt is lithium nitrate and the nickel compound is basic nickel carbonate.

In still another embodiment, the lithiated nickel dioxide containing gallium is obtained by adding a basic compound to an aqueous solution of gallium nitrate to attain a pH of 10 or more, dissolving lithium nitrate in the resultant solution, adding basic nickel carbonate thereto, evaporating the water content of the solution to obtain a mixture, and firing the mixture in an atmosphere containing oxygen.

In one embodiment, the basic compound is lithium hydroxide.

In one embodiment, the lithiated nickel dioxide containing gallium has a crystallite size of 700 Å or less determined through X-ray powder diffraction.

In one embodiment, the lithium secondary battery is charged at least once at the time of the production thereof, at 220 mAh/g or more per weight of the lithiated nickel dioxide containing gallium.

In one embodiment, the anode includes graphite as a sole component or a main component of the active material, and the liquid electrolyte comprises ethylene carbonate, dimethyl carbonate and ethyl methyl carbonate.

The objective of the present invention is to provide a lithium secondary battery having high energy density and excellent cycle and overcharge resistance characteristics even when charged/discharged at a high capacity.

DETAILED DESCRIPTION OF THE INVENTION

Figure 1:
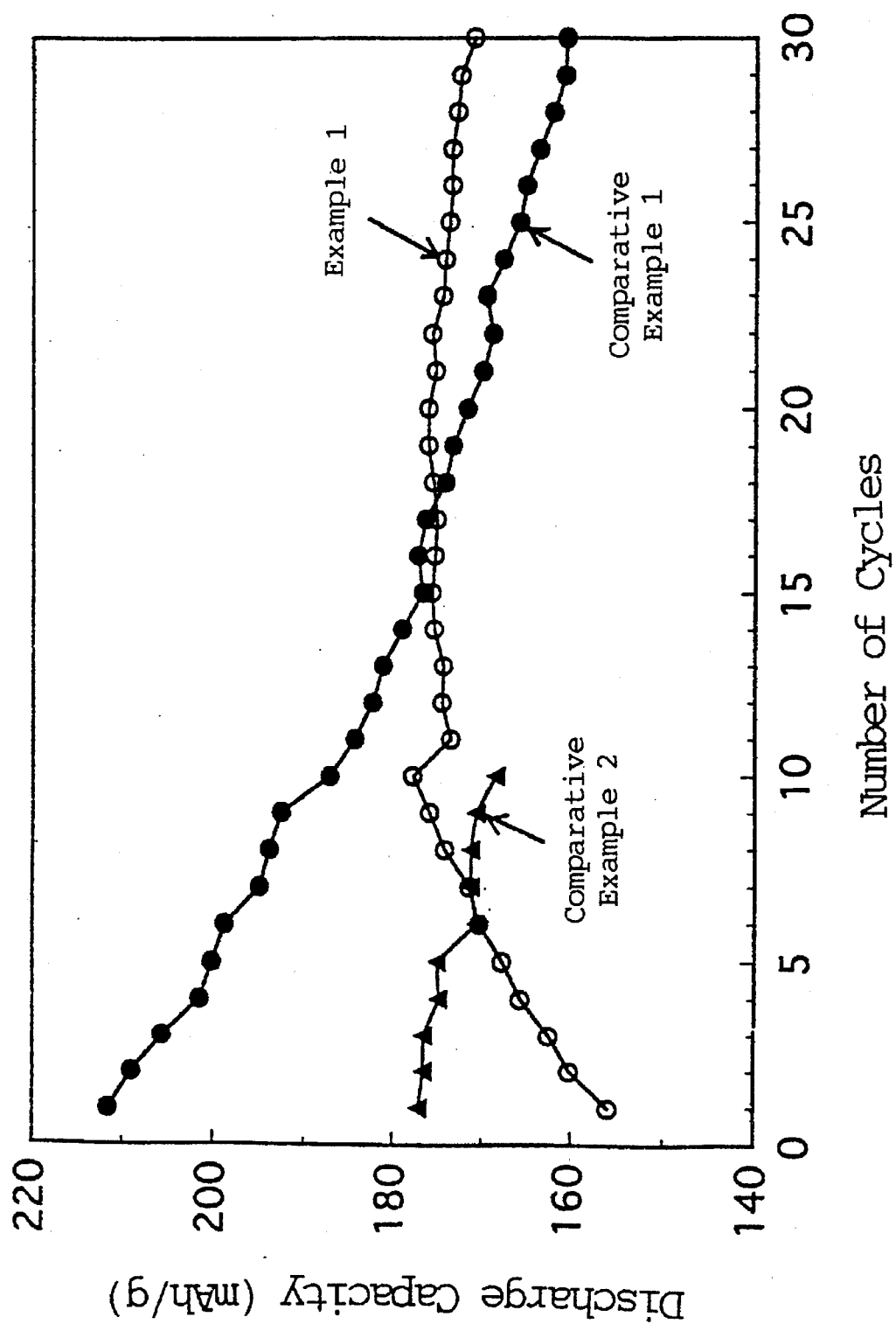
FIG. 1 is a graph showing the variation with cycles of the discharge capacity of lithium secondary batteries of an inventive example and comparative examples.

The present invention will now be described in detail.

A cathode of a lithium secondary battery of this invention includes, as an active material, a material that can be doped/undoped with lithium ions. The material that can be doped/undoped with lithium ions is lithiated nickel dioxide containing gallium.

As a method for adding gallium to lithiated nickel dioxide, previously synthesized lithiated nickel dioxide can be mixed with gallium or a gallium compound to be fired. However, in order to simplify the production process and homogeneously add a small amount of gallium, it is preferred that a lithium compound, a nickel compound, and gallium or a gallium compound are mixed with one another to be fired. Alternatively, a nickel compound and gallium or a gallium compound can be first mixed with each other to be fired, and then the fired mixture can be mixed with a lithium compound to be fired again. Similarly, a lithium compound and gallium or a gallium compound can be first mixed with each other to be fired, and then the fired mixture can be mixed with a nickel compound to be fired again.

Examples of the lithium compound used in the invention include lithium carbonate, lithium nitrate and lithium hydroxide. Examples of the nickel compound used in the invention include nickel oxide, nickel hydroxide, nickel nitrate, nickel carbonate $NiCO_3 \cdot wH_2O$ (wherein $w \geq 0$), basic nickel carbonate $xNiCO_3 \cdot yNi(OH)_2 \cdot zH_2O$ (wherein $x>0$, $y>0$ and $z>0$) and acidic nickel carbonate $NimH_2n(CO_3)m+n$ (wherein $m>0$ and $n>0$). As a gallium raw material, a gallium compound such as metal gallium, gallium oxide, gallium nitrate and gallium hydroxide can be used. In particular, a preferred gallium compound is a water-soluble gallium salt such as gallium nitrate.

The following is a preferred method for mixing the lithium compound, the nickel compound and the gallium compound and firing the obtained mixture. First, the nickel compound is dispersed in an aqueous solution including the gallium compound and the water-soluble lithium salt, and the water content of the obtained solution is evaporated. The thus obtained mixture is fired in an atmosphere containing oxygen. In this method, the water-soluble lithium salt can be homogeneously mixed with the gallium compound and the nickel compound. Therefore, the resulting lithiated nickel dioxide lacks lithium due to ununiformity in the mixed components.

As a result of further study, the present inventors found the following preferred combination of materials, in which gallium nitrate is preferably used as the gallium compound, lithium nitrate as the water-soluble lithium salt, and basic nickel carbonate as the nickel compound. When the lithiated nickel dioxide containing gallium obtained from these materials is used in a cathode, the resultant lithium secondary battery is found to have a high energy density.

In this combination, the aqueous solution of gallium nitrate and lithium nitrate is acidic. When basic nickel carbonate is added to this aqueous solution, carbon dioxide is generated and gallium hydroxide is precipitated therein. Therefore, gallium is actually added to and mixed in the solution as gallium hydroxide.

As a result of further study to improve the above-mentioned method, the present inventors found that when the pH of an aqueous solution of gallium nitrate is increased to exceed 10, the solution becomes cloudy due to the precipitation of gallium hydroxide, and becomes substantially transparent at a pH of 11 or more. When the solution has a pH of 10 or more, gallium is thought to be dispersed in the solution as gallium hydroxide in the shape of an extremely fine colloid, or dissolved in the solution as dioxogallate ions $GaO_2^-$. Accordingly, after a basic compound is added to the aqueous solution of gallium nitrate to increase the pH of the solution to exceed 10, lithium nitrate is then dissolved in the solution, and basic nickel carbonate is also dispersed in the solution. The water content of the thus obtained solution is evaporated, and the resultant mixture is fired in an atmosphere containing oxygen. When this method is adopted, gallium can be homogeneously mixed with the other materials, because, as described above, it is dispersed as gallium hydroxide in the shape of an extremely fine colloid or dissolved as dioxogallate ions $GaO_2^-$. In this method, side production of a composite oxide of lithium and gallium, which makes no contribution to charge/discharge, can be suppressed, and hence, this method is particularly preferred when only a small amount of gallium is to be added.

Further, when lithium hydroxide, lithium oxide or lithium peroxide is used as the basic compound to increase the pH of the gallium nitrate solution, lithium nitrate remains as a result of the neutralization reaction between such a lithium compound and the solution. Lithium nitrate, however, is consumed in and has no harmful effect on the production of lithiated nickel dioxide containing gallium. Therefore, the above-mentioned basic compounds are preferred, among which lithium hydroxide is most preferable because it is inexpensive and easy to handle.

The above-mentioned mixture is fired preferably in an atmosphere containing oxygen, more preferably in oxygen, and most preferably in an oxygen stream.

The firing temperature is preferably in the range between 350° C. and 800° C., and more preferably in the range between 600° C. and 750° C. When the firing temperature exceeds 800° C., the resulting lithiated nickel dioxide includes a larger ratio of a rock salt domain, in which lithium ions and nickel ions are irregularly arranged, which inhibits reversible charge/discharge. When the firing temperature is below 350° C., the generation reaction for lithiated nickel dioxide is scarcely effected.

The firing time is preferably 2 hours or more, and more preferably 5 hours or more.

The amount of gallium to be added is preferably as small as possible, since gallium or gallium compounds are expensive. Specifically, when the molar ratio of gallium to be mixed with the total amount of gallium and nickel compound is taken as x, the relationship of $0<x\leq 0.2$ is preferably satisfied. When x is less than 0.05, the diffraction peak in X-ray powder diffraction of a composite oxide of lithium and gallium, which makes no contribution to reversible charge/discharge, has a smaller intensity, or there appears to be no diffraction peak for the composite oxide of lithium and gallium. This is advantageous in regard to the discharge capacity per volume or weight. Therefore, the relationship of $0<x\leq 0.05$ is more preferred. Further, taking both the discharge capacity and the cycle characteristic into consideration, the relationship of $0.001<x\leq 0.02$ is most preferred.

Furthermore, the present inventors examined the relationship between the cycle characteristic and a crystallite size obtained through the X-ray powder diffraction of lithiated nickel dioxide containing gallium. As a result, the inventors found that lithiated nickel dioxide with a crystallite size of 700 Å or less exhibits excellent cycle characteristics and overcharge resistance. Thus, the present invention was accomplished.

The cathode of the lithium secondary battery of the present invention includes, as an active material, the above-mentioned lithiated nickel dioxide containing gallium, and can further include, as additional components, a carbonaceous material as a conductive substance and a thermoplastic resin as a binder.

Examples of the carbonaceous material include natural graphite, artificial graphite and cokes. Examples of the thermoplastic resin include poly(vinylidene fluoride) (hereinafter referred to as PVDF), PTFE, polyethylene and polypropylene.

The anode of the present lithium secondary battery includes a lithium metal, a lithium alloy or a material that can be doped/undoped with lithium ions. Examples of the material that can be doped/undoped with lithium ions include carbonaceous materials such as natural graphite, artificial graphite, cokes, carbon black, pyrolytic carbons, carbon fibers and fired products of organic polymer compounds. Among the carbonaceous materials, the graphitic materials, such as a natural graphite or an artificial graphite, are more preferable than others for the anode, because of the flatness of their charging/discharging potential and because of their low average working potential, which, when combined with a cathode, provides high energy density. The carbonaceous material can be in any shape, including a flake, a sphere, a fiber or an agglomerate of fine powder. The anode can further include a thermoplastic resin as a binder, if necessary. Examples of the thermoplastic resin include PVDF, PTFE, polyethylene and polypropylene.

The electrolyte of the present lithium secondary battery can be liquid or solid. An example of the liquid electrolyte includes a nonaqueous liquid electrolyte in which a lithium salt is dissolved in an organic solvent. An example of the solid electrolyte includes a so-called solid electrolyte.

The lithium salt to be dissolved in the nonaqueous liquid electrolyte is one of, or a combination of two or more of, $LiClO_4$, $LiPF_6$, $LiAsF_6$, $LiSbF_6$, $LiBF_4$, $LiCF_3SO_3$, $LiN(CF_3SO_2)_2$, $Li_2B_{10}Cl_{10}$, lower aliphatic lithium carboxylate and $LiAlCl_4$.

Examples of the organic solvent include carbonates, such as propylene carbonate, ethylene carbonate, dimethyl carbonate, diethyl carbonate and ethyl methyl carbonate; ethers, such as 1,2-dimethoxyethane, 1,3-dimethoxypropane, tetrahydrofuran and 2-methyltetrahydrofuran; esters, such as methyl formate, methyl acetate and γ-butyrolactone; nitriles, such as acetonitrile and butyronitrile; amides, such as N,N-dimethylformamide, and N,N-dimethylacetamide; carbamates, such as 3-methyl-2-oxazolidone; and sulfur-containing compounds, such as sulfolane, dimethylsulfoxide and 1,3-propane sulfone. Generally, a combination of two or more of these compounds is used. In particular, a mixed solvent including a carbonate is preferably used, and a mixed solvent of a combination of a cyclic carbonate and a non-cyclic carbonate or a combination of a cyclic carbonate and an ether is more preferably used. Among the mixed solvents of cyclic carbonates and non-cyclic carbonates, the solvents which comprise ethylene carbonate, dimethyl carbonate, and ethyl methyl carbonate are more preferable than others, because they provide a wide operating temperature range, excellent drain capability and they hardly decompose when they are used with an anode including said graphitic materials.

Examples of the solid electrolyte include a polymer electrolyte, such as polyethylene oxide polymer compounds and polymer; compounds including at least one of a polyorganosiloxane branch and a polyoxyalkylene branch; a sulfide type electrolyte, such as $Li_2S$—$SiS_2$, $Li_2S$—$GeS_2$, $Li_2S$—$P_2S_5$ and $Li_2S$—$B_2S_3$, and an inorganic compound type electrolyte including sulfide such as $Li_2S$—$SiS_2$—$Li_3PO_4$ and $Li_2S$—$SiS_2$—$Li_2SO_4$. Further, a so-called gel type electrolyte, in which a nonaqueous liquid electrolyte is held by a polymer, can be used.

The shape of the present lithium secondary battery is not particularly specified, and can be in any shape including paper, a coin, a cylinder and a rectangular parallelepiped.

According to the present invention, the lithium secondary battery can attain excellent cycle characteristics even when charged/discharged at a high capacity, and also can attain a high energy density, because it has a higher discharging voltage than a conventional lithium secondary battery using pure lithiated nickel dioxide. Although it is not clear why the present lithium secondary battery attains these excellent characteristics, the reason is considered to be that the structure of lithiated nickel dioxide is stabilized when charged/discharged, especially when deeply charged, by incorporation of gallium into the crystal structure of lithiated nickel dioxide in some way, or by suppressing the growth of the crystallite of lithiated nickel dioxide by gallium.

In a battery using pure lithiated nickel dioxide, when it is charged by using lithium as a counter electrode, an open circuit voltage (hereinafter referred to as OCV) increases as the charge capacity increases. It is observed that when the charge capacity exceeds approximately 200 mAh/g, the OCV no longer increases but remains constant at 4.18 V, a potential against lithium. Whereas in the battery using lithiated nickel dioxide containing gallium, the OCV does not remain constant at 4.18 V, but further increases as the charge capacity increases. Further, the charging/discharging curve of the battery using pure lithiated nickel dioxide has several inflection points that can be regarded to correspond to the change of its crystal structure, while the charging/discharging curve of the battery using lithiated nickel dioxide containing gallium is smooth and it is difficult to identify such an inflection point in this curve. From these facts, it is thought that the gallium added to the lithiated nickel dioxide affects the crystal structure or the crystallite size of the lithiated nickel dioxide in some way.

The present lithium secondary battery using lithiated nickel dioxide containing gallium as an active material for the cathode exhibits a high energy density and has an excellent cycle characteristics even when charged/discharged at a high capacity. The lithium secondary battery, however, exhibited a comparatively large overvoltage at an initial stage, the reason for which is not apparent. Therefore, at first, the battery had a problem in that several charging/discharging cycles were required to settle the overvoltage, namely, the rise of the discharge capacity of the battery was delayed.

The present inventors made further study to overcome this problem, and found that a quick rise in discharge capacity can be attained by decreasing the overvoltage at the initial stage through conducting at least one charge at 220 mAh/g per weight of lithiated nickel dioxide containing gallium at the time of the production thereof.

The present invention will now be described in more detail by way of examples, which do not limit the invention.

EXAMPLES

An electrode and a plate battery for a charging/discharging test were manufactured as follows, unless otherwise mentioned:

To a mixture of lithiated nickel dioxide or lithiated nickel dioxide containing gallium, as an active material, and acetylene black, as a conductive substance, was added a 1-methyl-2-pyrrolidone solution (hereinafter referred to as NMP), including PVDF as a binder, so as to attain a composition ratio among the active material, the conductive substance and the binder of 91:6:3 (weight ratio). The resultant solution was kneaded to obtain a paste. The paste was coated over a #200 stainless mesh, which was to work as a current collector, and the mesh bearing the paste was dried under vacuum at a temperature of 150° C. for 8 hours. Thus, an electrode was produced.

By using the thus obtained electrode, a plate battery was manufactured together with a liquid electrolyte described below, a polypropylene microporous membrane as a separator and metal lithium as a counter electrode (i.e., an anode). The liquid electrolyte used was a solution in which $LiClO_4$ was dissolved at a proportion of 1 molar/litter in a 1:1 mixture of propylene carbonate (hereinafter referred to as PC) and 1,2-dimethoxyethane (hereinafter referred to as DME) (hereinafter this liquid electrolyte is referred to as $LiClO_4$/PC+DME.); or a solution in which $LiPF_6$ was dissolved at a proportion of 1 molar/litter in a 30:35:35 mixture of ethylene carbonate (hereinafter referred to as EC), dimethyl carbonate (hereinafter referred to as DMC) and ethyl methyl carbonate (hereinafter referred to as EMC) (hereinafter this liquid electrolyte is referred to as $LiPF_6$/EC+DMC+EMC) was used.

X-ray powder diffraction was conducted by using a RAD-IIC system (manufactured by Rigaku Corporation) under the following condition:

X-ray: CuKα(monochromatized by a graphite curved monochromator)

Voltage–current: 40 kV–30 mA

Range of measured angle: 2θ=15° to 140°

Slit: DS-1°, RS-0.15 mm, SS-1°

Step: 0.02°

Counting time: 1 second

The data obtained were processed by using an MXP system (manufactured by Mac Science Co., Ltd.) as follows: first, a true profile was obtained by a Stokes method, and then a crystallite size was calculated by a Warren & Averbach method.

EXAMPLE 1

First, 2.09 g of gallium nitrate ($Ga(NO_3)_3 \cdot 9H_2O$; manufactured by Kojundo Chemical Laboratory Co., Ltd.; 3N graded reagent), 7.23 g of lithium nitrate (manufactured by Wako Pure Chemical Industries, Ltd.; guaranteed graded reagent) were dissolved in 15.1 g of water. Then, 11.91 g of basic nickel carbonate ($NiCO_3 \cdot 2Ni(OH)_2 \cdot 4H_2O$ (manufactured by Wako Pure Chemical Industries, Ltd.; graded reagent) was added to and homogeneously dispersed in the obtained solution. The water content of the resultant solution was evaporated, and the mixture obtained was charged in a tubular furnace having an alumina core tube and fired in an oxygen stream of 50 cm$^3$/min. at a temperature of 660° C. for 15 hours. At this point, the molar ratio x of gallium to the total amount of gallium and nickel was set to be 0.05.

By using the thus obtained powder, a plate battery (in which a liquid electrolyte was $LiClO_4$/PC+DME) was manufactured and subjected to a charging/discharging test under a maximum charging voltage of 4.3 V, a minimum discharging voltage of 2.5 V and a constant current of 0.17 mA/cm$^2$. During the charging/discharging test, a resting time of 2 hours was provided between the termination of the charge and the start of the discharge so as to settle an overvoltage, and the voltage immediately before the start of the discharge was regarded as the OCV after the termination of the charge. The OCVs after the termination of the charge in the 5th cycle and the 20th cycle were both 4.22 V.

FIG. 1 shows the variation of the discharge capacity up to the 30th cycle. The discharge capacity in the 30th cycle was 171mAh/g, and thus, the battery exhibited excellent cycle characteristics.

Figure 2:
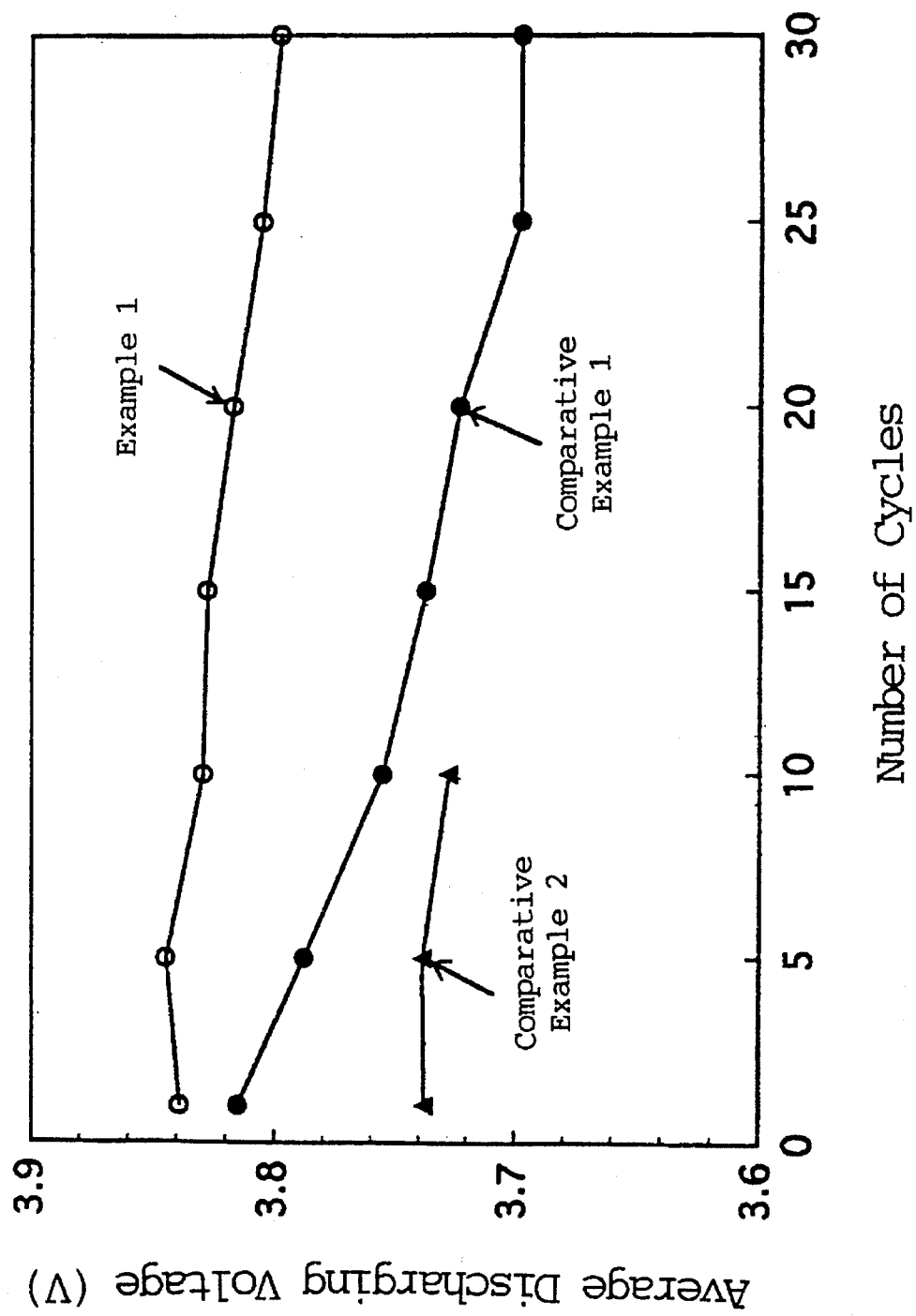
FIG. 2 is a graph showing the variation with cycles of the average discharging voltages of the lithium secondary batteries of the inventive example and comparative examples.

FIG. 2 shows the variation of the average discharging voltage up to the 30th cycle. The average discharging voltage in the 30th cycle was kept at 3.80 V.

Figure 3:
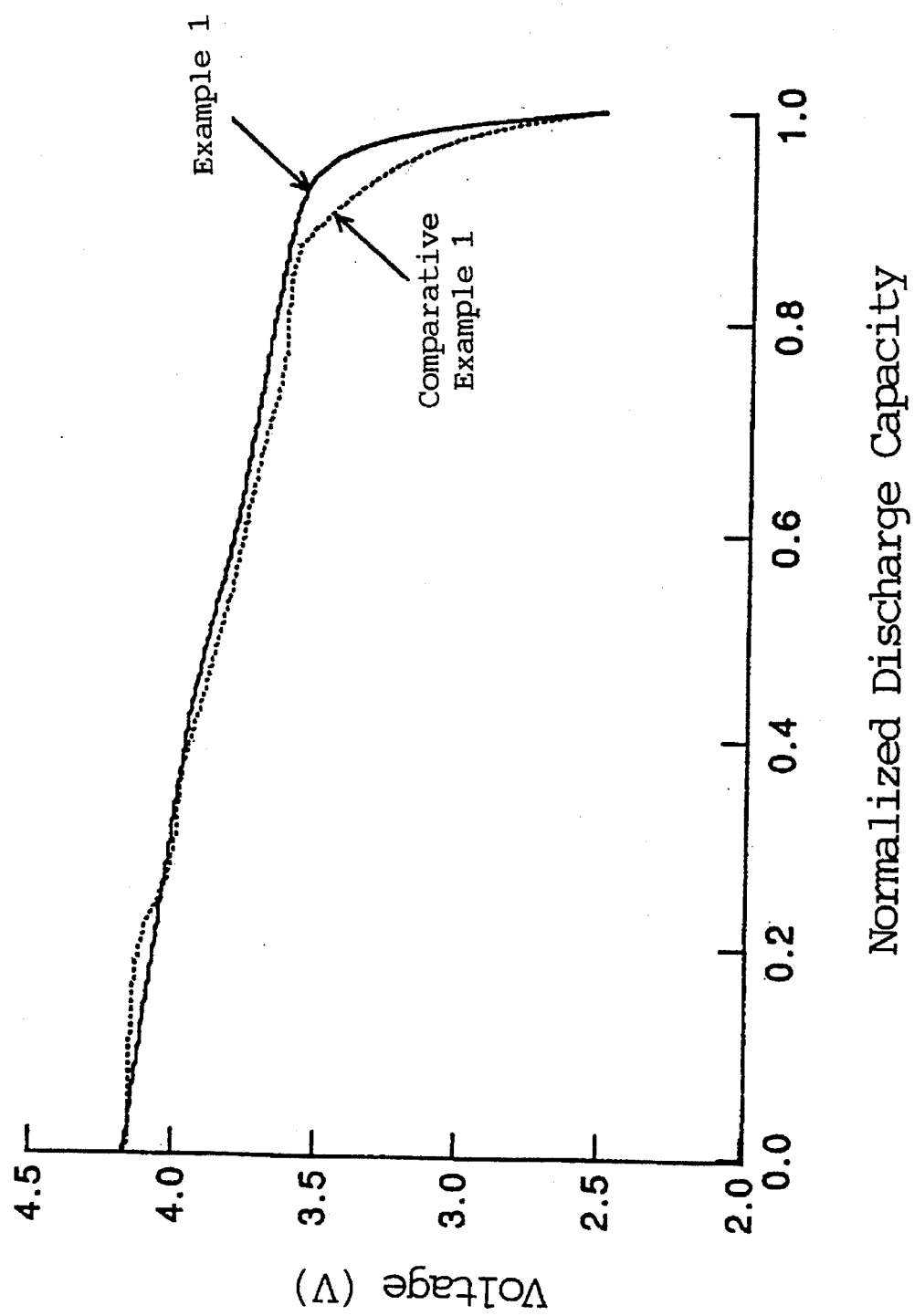
FIG. 3 is a graph showing the discharging curves of lithium secondary batteries of an inventive example and a comparative example.

FIG. 3 shows the discharging curve in the first cycle. In this graph, the discharge capacity is normalized for comparison. This graph reveals that the discharging curve obtained by using lithiated nickel dioxide containing gallium is smooth and that it is difficult to identify an inflection point that is conventionally observed in using pure lithiated nickel dioxide.

Comparative Example 1

First, 94.1 g of lithium nitrate (manufactured by Wako Pure Chemical Industries, Ltd.; guaranteed graded reagent) was dissolved in 150 g of water, and then 163.0 g of basic nickel carbonate ($NiCO_3 \cdot 2Ni(OH)_2 \cdot 4H_2O$ (manufactured by Wako Pure Chemical Industries. Ltd.; graded reagent) was added thereto and homogeneously dispersed. The water content of the resultant solution was evaporated, and the mixture obtained was charged in a tubular furnace having an alumina core tube and fired in an oxygen stream of 50 $cm^3$/min. at a temperature of 720° C. for 5 hours.

By using the thus obtained powder, a plate battery (in which a liquid electrolyte was $LiCLO_4$/PC+DME) was manufactured and subjected to a charging/discharging test under a maximum charging voltage of 4.3 V, a minimum discharging voltage of 2.5 V and a constant current of 0.17 $mA/cm^2$. During the charging/discharging test, a resting time of 2 hours was provided between the termination of the charge and the start of the discharge so as to settle an overvoltage, and the voltage immediately before the start of the discharge was regarded as the OCV after the termination of the charge. The OCVs after the termination of the charge in the 5th cycle and the 20th cycle were both 4.18 V.

The variation of the discharge capacity up to the 30th cycle is shown in FIG. 1. The discharge capacity in the 30th cycle was 161 mAh/g, which was largely degraded as compared with the discharge capacity in the initial stage of the test.

The variation of the average discharging voltage up to the 30th cycle is shown in FIG. 2. The average discharging voltage in the 30th cycle was 3.70 V, which was lower by 0.1 V than that of the battery of Example 1. The discharging curve in the first cycle is shown in FIG. 3. In this graph, the discharge capacity is normalized for comparison. The discharge capacity of this battery has a complicated shape having several infection points that are thought to correspond to changes in the crystal structure. This discharging curve is apparently different from that of the battery using lithiated nickel dioxide containing gallium.

Comparative Example 2

By using the powder of lithiated nickel dioxide obtained in Comparative Example 1, a plate battery (in which a liquid electrolyte was $LiClO_4$/PC+DME) was similarly manufactured and subjected to a charging/discharging test under a maximum charging voltage of 4.2 V, a minimum discharging voltage of 2.5 V and a constant current of 0.17 $mA/cm^2$.

The variation of the discharge capacity and that of the average discharging voltage up to the 10th cycle are shown in FIGS. 1 and 2, respectively. The discharge capacity in the 10th cycle was 169 mAh/g. Thus, when the maximum charging voltage is decreased, cycle characteristics are improved, whereas the discharge capacity is decreased. The average discharging voltage in the 10th cycle was 3.73 V, which was lower by approximately 0.1 V than that of the battery of Example 1.

EXAMPLE 2

First, 0.235 g of gallium oxide (manufactured by Kojundo Chemical Laboratory Co., Ltd.; 3N graded reagent), 3.62 g of lithium nitrate (manufactured by Wako Pure Chemical Industries, Ltd.; guaranteed graded reagent), and 5.96 g of basic nickel carbonate ($NiCO_3 \cdot 2Ni(OH)_2 \cdot 4H_2O$ (manufactured by Wako Pure Chemical Industries, Ltd.; graded reagent) were homogeneously mixed in an agate mortar. The mixture obtained was charged in a tubular furnace having an alumina core tube and fired in an oxygen stream of 50 $cm^3$/min. at a temperature of 660° C. for 15 hours. At this point, the molar ratio x of gallium to the total amount of gallium and nickel was set to be 0.05.

By using the thus obtained powder, a plate battery (in which an liquid electrolyte was $LiClO_4$/PC+DME) was manufactured and subjected to a charging/discharging test under a maximum charging voltage of 4.3 V, a minimum discharging voltage of 2.5 V, and a constant current of 0.17 $mA/cm^2$. During the charging/discharging test, a resting time of 2 hours was provided between the termination of the charge and the start of the discharge so as to settle an overvoltage, and the voltage immediately before the start of the discharge was regarded as the OCV after the termination of the charge. The OCVs after the termination of the charge in the 5th cycle and the 20th cycle were both 4.22 V.

The discharge capacity in the 30th cycle was 165 mAh/g and the average discharging voltage in the 30th cycle was 3.78 V.

Comparative Example 3

By using the powder obtained in Comparative Example 1, a plate battery (in which a liquid electrolyte was $LiClO_4$/PC+DME) was manufactured and subjected to a charging/discharging test using charge by a constant current and voltage and discharge by a constant current under the following condition:

Maximum charging voltage: 4.3 V

Charging time: 6 hours

Charging current: 1 $mA/cm^2$

Minimum discharging voltage: 2.5 V

Discharging current: 0.17 $mA/cm^2$

The above-mentioned charge by a constant current and voltage will be described in more detail. At first a battery is charged up to a maximum charging voltage (4.3 V in this Comparative Example) with a constant charging current (1 $mA/cm^2$ in this Comparative Example), then the charging current is decreased to keep the voltage of the battery as high as the maximum charging voltage. The charge is terminated when total charging time reaches a predetermined charging time (6 hours in this Comparative Example).

Figure 4:
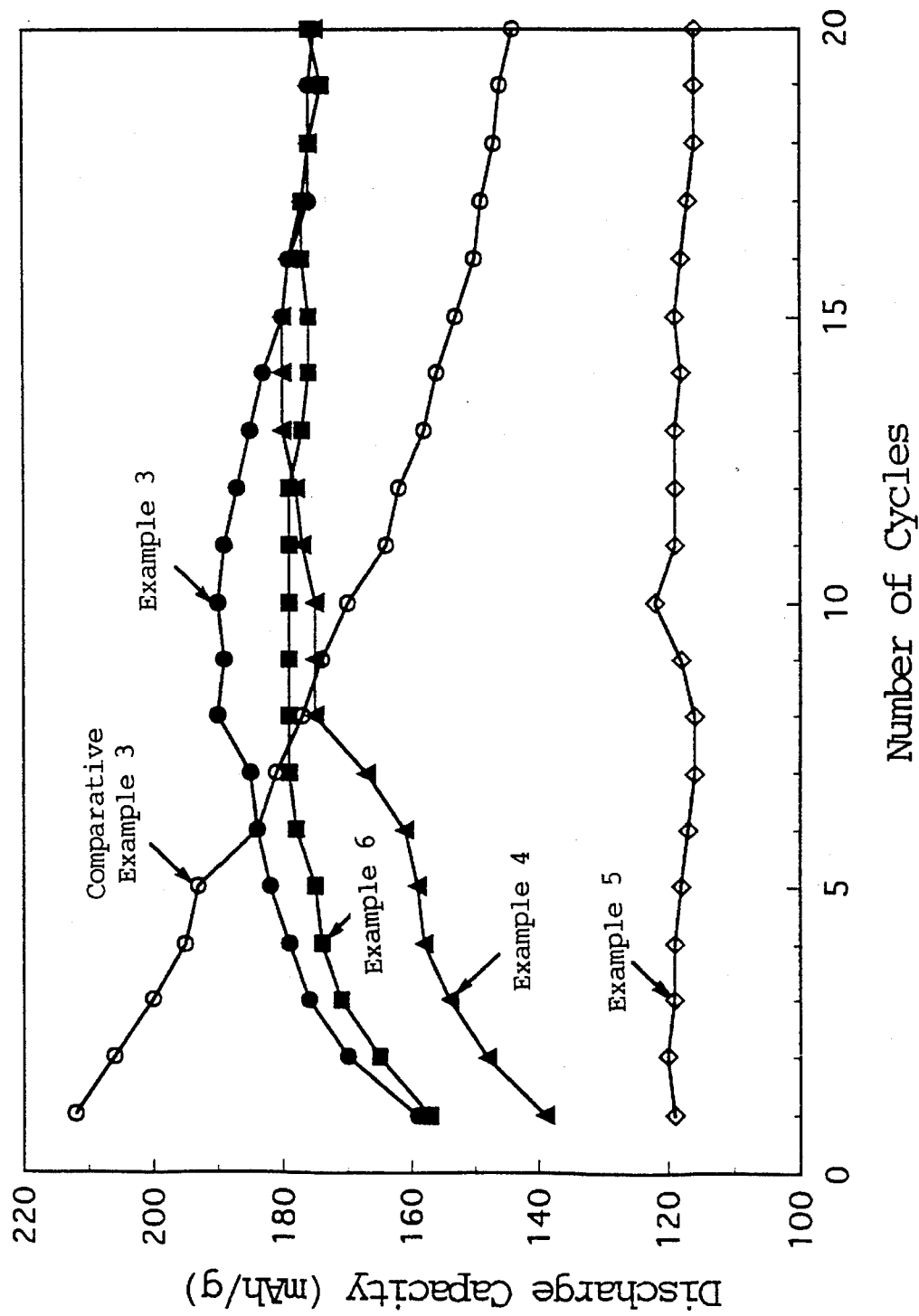
FIG. 4 is a graph showing the variation with cycles of the discharge capacities of lithium secondary batteries of other examples and another comparative example.

The discharge capacity up to the 20th cycle is shown in FIG. 4. As compared with the battery of Comparative Example 1, this battery was degraded faster with cycles, because it was charged with a constant current and voltage under a more severe condition, namely, it was supplied with a voltage of 4.3 V for a longer time, although it was discharged in the same manner as in Comparative Example 1.

EXAMPLE 3

By using the powder obtained in Example 1, a plate battery (in which a liquid electrolyte was $LiClO_4$/PC+DME) was manufactured and subjected to a charging/discharging test using charge by a constant current and voltage and discharge by a constant current under the same condition as in Comparative Example 3.

The variation of the discharge capacity up to the 20th cycle is shown in FIG. 4. Although the capacity is slightly decreased, with the 10th cycle being a peak, this battery exhibited superior cycle characteristics as compared with the battery containing no gallium (i.e., Comparative Example 3), even when the battery was more severely charged with a constant current and voltage.

EXAMPLE 4

First, 108.6 g of lithium nitrate (manufactured by Wako Pure Chemical Industries, Ltd.; guaranteed graded reagent) was dissolved in 150 g of water. Then, to the resultant solution were added 9.06 g of gallium hydroxide ($Ga(OH)_3$; manufactured by Kojundo Chemical Laboratory Co., Ltd.; 3N graded reagent) and 190.5 g of basic nickel carbonate ($NiCO_3 \cdot 2Ni(OH)_2 \cdot 4H_2O$ (manufactured by Wako Pure Chemical Industries, Ltd.; graded reagent) and homogeneously dispersed. The water content of the resultant solution was evaporated. The mixture obtained was charged in a tubular furnace having an alumina core tube and fired in an oxygen stream of 50 $cm^3$/min. at a temperature of 660° C. for 15 hours. At this point, the molar ratio x of gallium to the total amount of gallium and nickel was set to be 0.05.

By using the thus obtained powder, a plate battery (in which a liquid electrolyte was $LiClO_4$/PC+DME) was manufactured and subjected to a charging/discharging test using charge by a constant current and voltage and discharge by a constant current under the same conditions as in Example 3.

The variation of the discharge capacity up to the 20th cycle is shown in FIG. 4. Although the discharge capacity in the initial stage was small and the rise of the discharge capacity was delayed, the battery exhibited excellent cycle characteristics from the 8th cycle on, even when charged with the constant current and voltage.

Figure 5:
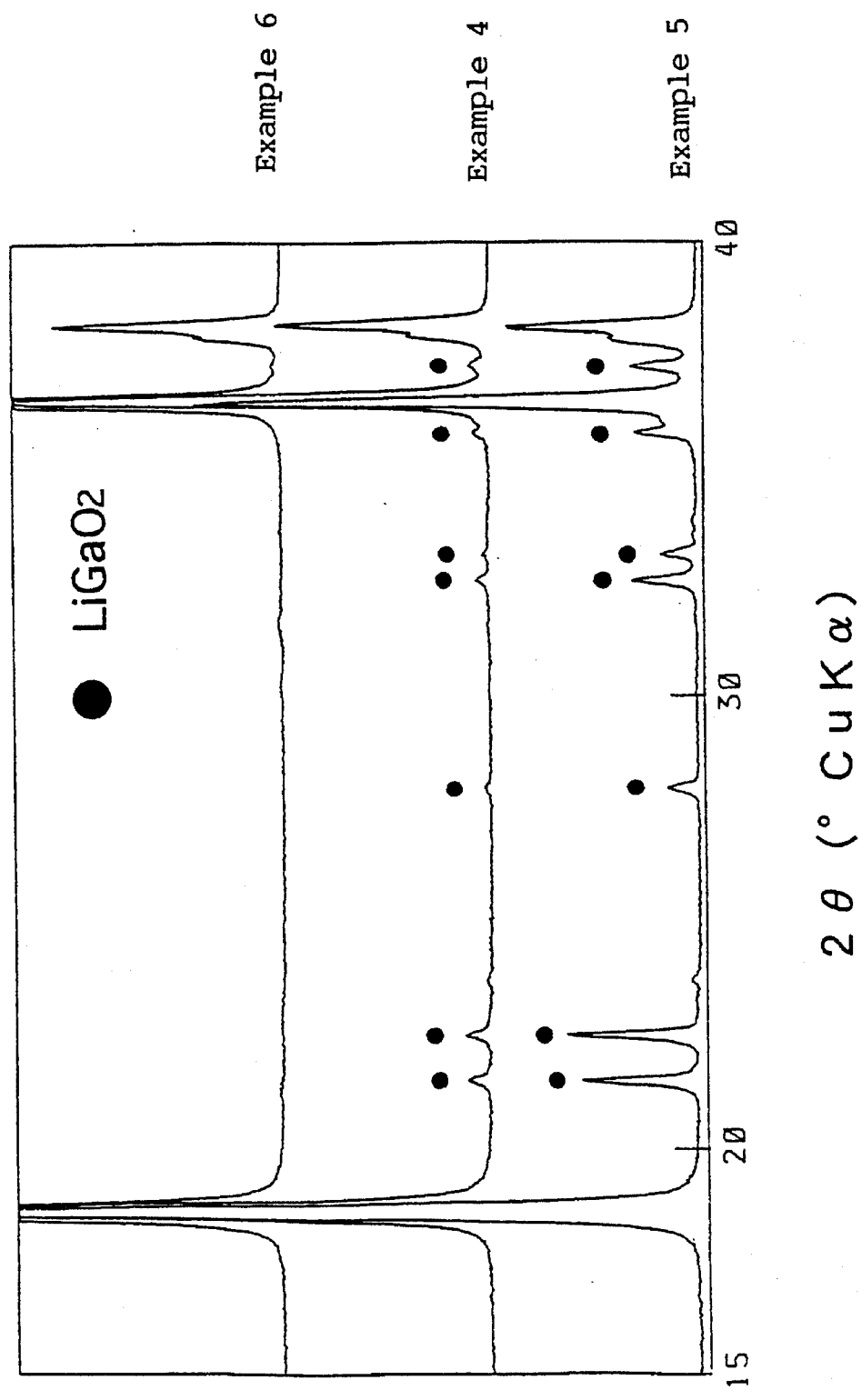
FIG. 5 shows the results of powder X-ray diffraction performed on the cathode active materials of the examples.

The X-ray diffraction of the obtained powder is shown in FIG. 5. In this powder, a small amount of a composite oxide of lithium and gallium, $LiGaO_2$, was found. EXAMPLE 5

First, 13.64 g of gallium nitrate ($Ga(NO_3)_3 \cdot 9H_2O$; manufactured by Kojundo Chemical Laboratory Co., Ltd.; 3N graded reagent) and 12.06 g of lithium nitrate (manufactured by Wako Pure Chemical Industries, Ltd.; guaranteed graded reagent) were dissolved in 19.3 g of water. Then, 16.72 g of basic nickel carbonate ($NiCO_3 \cdot 2Ni(OH)_2 \cdot 4H_2O$ (manufactured by Wako Pure Chemical Industries, Ltd.; graded reagent) was added to and homogeneously dispersed in the solution obtained, and the water content of the resultant solution was evaporated. The mixture obtained was charged in a tubular furnace having an alumina core tube and fired in an oxygen stream of 50 $cm^3$/min. at a temperature of 660° C. for 15 hours. At this point, the molar ratio x of gallium to the total amount of gallium and nickel was set to be 0.2.

By using the thus obtained powder, a plate battery (in which a liquid electrolyte was $LiClO_4$/PC+DME) was manufactured and subjected to a charging/discharging test using charge by a constant current and voltage and discharge by a constant current under the same conditions as in Example 3.

The variation of the discharge capacity up to 20th cycle is shown in FIG. 4. Although the discharge capacity was as small as 120 mAh/g, the battery exhibited excellent cycle characteristics even when charged with a constant current and voltage.

The result of the X-ray diffraction of the powder obtained is shown in FIG. 5. In this powder, a large amount of the composite oxide of lithium and gallium, $LiGaO_2$, was found. The cycle characteristic was improved by the addition of gallium in this battery, but it had a small discharge capacity per weight due to the presence of a large amount of the compound making no contribution to the charge/discharge. It is thought that the compound blocks a conductive path in the battery, thereby making the discharge capacity small.

EXAMPLE 6

First, 6.97 g of gallium nitrate ($Ga(NO_3)_3 \cdot 9H_2O$; manufactured by Kojundo Chemical Laboratory Co., Ltd.; 3N graded reagent) was dissolved in 33.5 g of water. The pH of the solution obtained was 1.47. Then, 2.61 g of lithium hydroxide monohydrate ($LiOH \cdot H_2O$; manufactured by Wako Pure Chemical Industries, Ltd.; guaranteed graded reagent) was added to and dissolved in the solution. The resultant solution became cloudy and then became transparent. The pH of the solution at this point was 11.16. Then, 20.67 g of lithium nitrate (manufactured by Wako Pure Chemical Industries, Ltd.; guaranteed graded reagent) was dissolved in the solution, and 42.34 g of basic nickel carbonate ($NiCO_3 \cdot 2Ni(OH)_2 \cdot 4H_2O$ (manufactured by Wako Pure Chemical Industries, Ltd.; graded reagent) was successively added thereto and homogeneously dispersed. The water content of the resulting solution was evaporated, and the mixture obtained was charged in a tubular furnace having an alumina core tube and fired in an oxygen stream of 50 $cm^3$/min. at a temperature of 660° C. for 15 hours. The molar ratio x of gallium to the total amount of gallium and nickel was set to be 0.05.

By using the thus obtained powder, a plate battery (in which a liquid electrolyte was $LiClO_4$/PC+DME) was manufactured and subjected to a charging/discharging test using charge by a constant current and voltage and discharge by a constant current under the same conditions as in Example 3.

The variation of the discharge capacity up to the 20th cycle is shown in FIG. 4. This battery had a quicker rise in discharge capacity than that of Example 4, and exhibited superior cycle characteristics to that of Example 3 from the 7th cycle on.

The result of the x-ray diffraction of the powder obtained is shown in FIG. 5. In this powder, no diffraction line for the composite oxide of lithium and gallium, $LiGaO_2$, was found.

Comparative Example 4

By using the powder obtained in Comparative Example 1, a plate battery (in which a liquid electrolyte was $LiPF_6$/EC+DMC+EMC) was manufactured and subjected to a charging/discharging test using charge by a constant current and voltage and discharge by a constant current under the following condition:

Maximum charging voltage: 4.3 V

Charging time: 8 hours

Charging current: 0.3 mA/cm

Minimum discharging voltage: 3.0 V

Discharging current: 0.3 mA/$cm^2$

Figure 6:
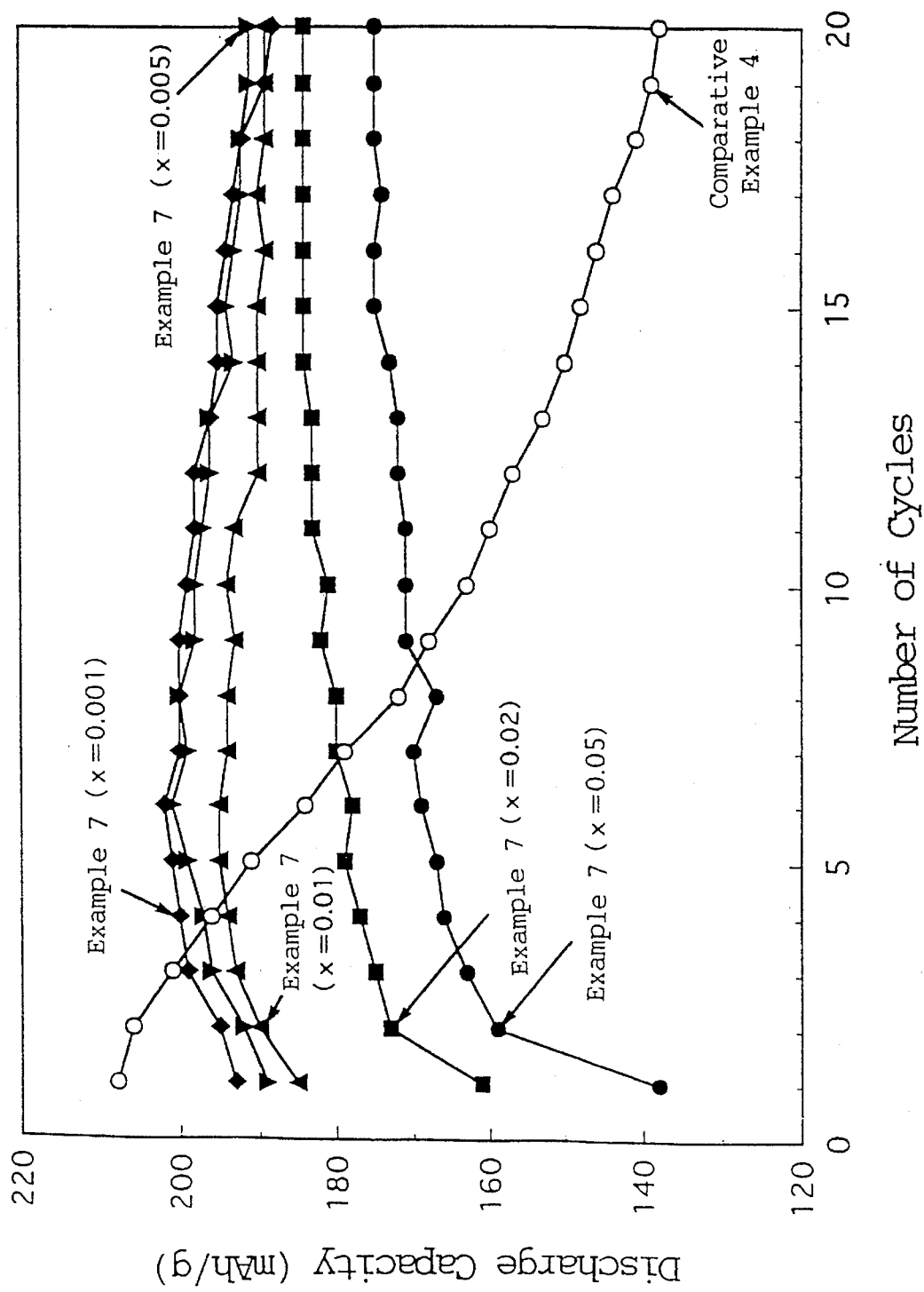
FIG. 6 is a graph showing the variation with cycles of the discharge capacities of lithium secondary batteries of still other examples and another comparative example.

The variation of the discharge capacity up to 20th cycle is shown in FIG. 6. Further, a capacity holding ratio R1 from the 1st cycle to the 10th cycle (i.e., the discharge capacity in the 10th cycle/the discharge capacity in the 1st cycle) and a capacity holding ratio R2 from the 11th cycle to the 20th cycle (i.e., the discharge capacity in the 20th cycle/the discharge capacity in the 11th cycle) are listed in Table 1 below. Although the battery was degraded less and less through the cycles, the discharge capacity was largely decreased as compared with that at the initial stage.

TABLE 1

|  | X | R1 | R2 | Crystallite size (Å) |
|---|---|---|---|---|
| Comparative 4 | 0 | 0.783 | 0.862 | 810 |
| Example 7 | 0.05 | 1.239 | 1.023 | 320 |
|  | 0.02 | 1.124 | 1.005 | 330 |
|  | 0.01 | 1.048 | 0.979 | 370 |
|  | 0.005 | 1.047 | 0.969 | 360 |
|  | 0.001 | 1.058 | 0.949 | 430 |

EXAMPLE 7

Gallium nitrate $(Ga(NO_3)_3 \cdot 6.2H_2O)$ (manufactured by Kojundo Chemical Laboratory Co., Ltd.; 3N graded reagent), lithium nitrate (manufactured by Wako Pure Chemical Industries, Ltd.; guaranteed graded reagent) and basic nickel carbonate $(NiCO_3 \cdot 2Ni(OH)_2 \cdot 4H_2O$ (manufactured by Wako Pure Chemical Industries, Ltd.; graded reagent) were weighed so as to achieve molar ratios x of gallium to the total amount of gallium and nickel of 0.05, 0.02, 0.01, 0.005 and 0.001, and the thus weighed compounds were mixed to obtain the following five kinds of mixtures: Each desired amount of gallium nitrate was dissolved in water, and lithium hydroxide monohydrate $(LiOH \cdot H_2O$; manufactured by Wako Pure chemical Industries, Ltd.; guaranteed graded reagent) was added thereto to adjust the pH of the resultant solution. The pH was adjusted to be 11.1, 11.2, 11.4, 11.2 and 10.6 in the solutions having molar ratios x of 0.05, 0.02, 0.01, 0.005 and 0.001, respectively. Then, basic nickel carbonate was added to the respective solutions and homogeneously dispersed, and the water content of the solutions were evaporated. Each of the resultant mixtures was charged in a tubular furnace having an alumina core tube and fired in an oxygen stream of 50 cm$^3$/min. at a temperature of 660° C. for 15 hours. At this point, the molar ratio of lithium to the total amount of gallium and nickel was set to be 1.05 in each solution.

By using the thus obtained powder, plate batteries (in which a liquid electrolyte was $LiPF_6/EC+DMC+EMC$) were manufactured and subjected to a charging/discharging test using charge by a constant current and voltage and discharge by a constant current under the same conditions as in Comparative Example 4.

The variation of the discharge capacity of each battery up to the 20th cycle is shown in FIG. 6. Further, a capacity holding ratio R1 from the 1st cycle to the 10th cycle (i.e., the discharge capacity in the 10th cycle/the discharge capacity in the 1st cycle) and a capacity holding ratio R2 from the 11th cycle to the 20th cycle (i.e., the discharge capacity in the 20th cycle/the discharge capacity in the 11th cycle) are listed in Table 1 above.

The results shown in FIG. 6 and Table 1 reveal that the batteries exhibited excellent cycle characteristics as compared with a battery containing no gallium, regardless of the molar ratio x. Further, in all the batteries, the discharge capacity was rather small at the initial stage of the test and increased as the test proceeded, also regardless of the molar ratio x. The reason for this phenomenon is not clear, but the phenomenon is found to correspond to gradually settling a comparatively large overvoltage at the initial stage. The speed at which the overvoltage is settled, the discharge capacity attained when increase capacity is stabilized, and the cycle characteristics attained thereafter depend upon the molar ratio x. Specifically, as the molar ratio x decreases from 0.05, settlement of the overvoltage occurs faster (i.e., it is settled by approximately the 5th cycle), and the discharge capacity attained when the increase capacity is stabilized becomes larger. With regard to cycle characteristics, the capacity is not decreased at all when $0.02 \leq x \leq 0.05$, while it is slightly decreased when $x<0.02$. Accordingly, a preferable range of the molar ratio x is $0.001<x \leq 0.02$, taking both the discharge capacity and the cycle characteristics into consideration.

Comparative Example 5

The powder obtained in Comparative Example 1 was subjected to X-ray powder diffraction, thereby obtaining a crystallite size in accordance with the above-mentioned method. The obtained result is listed in Table 1. By using this powder, a plate battery (in which the liquid electrolyte was $LiPF_6/EC+DMC+EMC$) was manufactured and subjected to an overcharging test in the following manner:

The battery was charged by a constant current and voltage under a condition of a maximum charging voltage of 4.2 V, a charging current of 0.3 mA/cm$^2$ and a charging time of 40 hours. Then, the battery was discharged by a constant current under a condition of a minimum discharging voltage of 3.0 V and a discharging current of 0.3 mA/cm$^2$. At this point, the charge capacity was 263 mAh/g and the discharge capacity was 221 mAh/g. When the charge/discharge was repeated under the same condition, the charge capacity and the discharge capacity became 219 mAh/g and 214 mAh/g, respectively. In this manner, the battery using this powder was excessively charged, which degraded the efficiency of the charge/discharge and decreased the discharge capacity.

EXAMPLE 8

The five kinds of powder obtained in Example 7 were subjected to X-ray powder diffraction, thereby obtaining crystallite sizes in accordance with the above-mentioned method. The results obtained are listed in Table 1. By using powders wherein the molar ratios of x are 0.02 and 0.005, plate batteries (in which a liquid electrolyte was $LiPF_6/EC+DMC+EMC$) were manufactured and subjected to an overcharging test as follows:

The batteries were charged by a constant current and voltage under a maximum charging voltage of 4.3 V, a charging current of 0.3 mA/cm$^2$ and a charging time of 40 hours, and then were discharged by a constant current of a minimum discharging voltage of 3.0 V and a discharging current of 0.03 mA/cm$^2$. The charging voltage in this example was 4.3 V, which is a more severe condition than in Comparative Example 5, where the charging voltage was 4.2 V.

The charge capacity and the discharge capacity of the battery using the powder where the molar ratio of x was 0.02, were 246 mAh/g and 191 mAh/g, respectively. The charge capacity and the discharge capacity of the battery using the powder where the molar ratio of x was 0.005, were 247 mAh/g and 207 mAh/g, respectively.

When the charge/discharge was repeated under the same condition, the charge capacity and the discharge capacity of the battery using the powder where the molar ratio of x was 0.02, became 191 mAh/g and 191 mAh/g, respectively. The charge capacity and the discharge capacity of the battery using the powder where the molar ratio of x was 0.005, became 206 mAh/g and 206 mAh/g, respectively.

Thus, it was found that the battery using the powder with a crystallite size of 700 Å or less, was not excessively charged, even when supplied with a high voltage of 4.3 V for a long time, which is not the case with the battery of Comparative Example 5. Further, it was found that the efficiency of the charge/discharge of such a battery was not degraded, and that the discharge capacity was substantially maintained. In this manner, an excellent overcharge resistance can be attained by using powder with a crystallite size of 700 Å or less.

EXAMPLE 9

In Example 7, the initial charge capacities of the batteries using the powder where the molar ratio of x was 0.05, 0.02, 0.01, 0.005 and 0.001, were 217 mAh/g, 218 mAh/g, 237 mAh/g, 235 mAh/g and 238 mAh/g, respectively. The rise of the discharge capacity was quicker in the battery with the initial charge capacity of 220 mAh/g or more. Therefore, the relationship between the charge capacity and the speed at which discharge capacity rose was studied by using the battery using the powder where the molar ratio of x was 0.02.

By using the powder where the molar ratio of x was 0.02, obtained in Example 7, two plate batteries (in which a liquid electrolyte was LiPF$_6$/EC+DMC+EMC) were manufactured. The cycle characteristics of the batteries were determined under the same condition as in Example 7, except that the initial charging time was respectively set to be 15 hours and 24 hours (which was 8 hours in Example 7).

Figure 7:
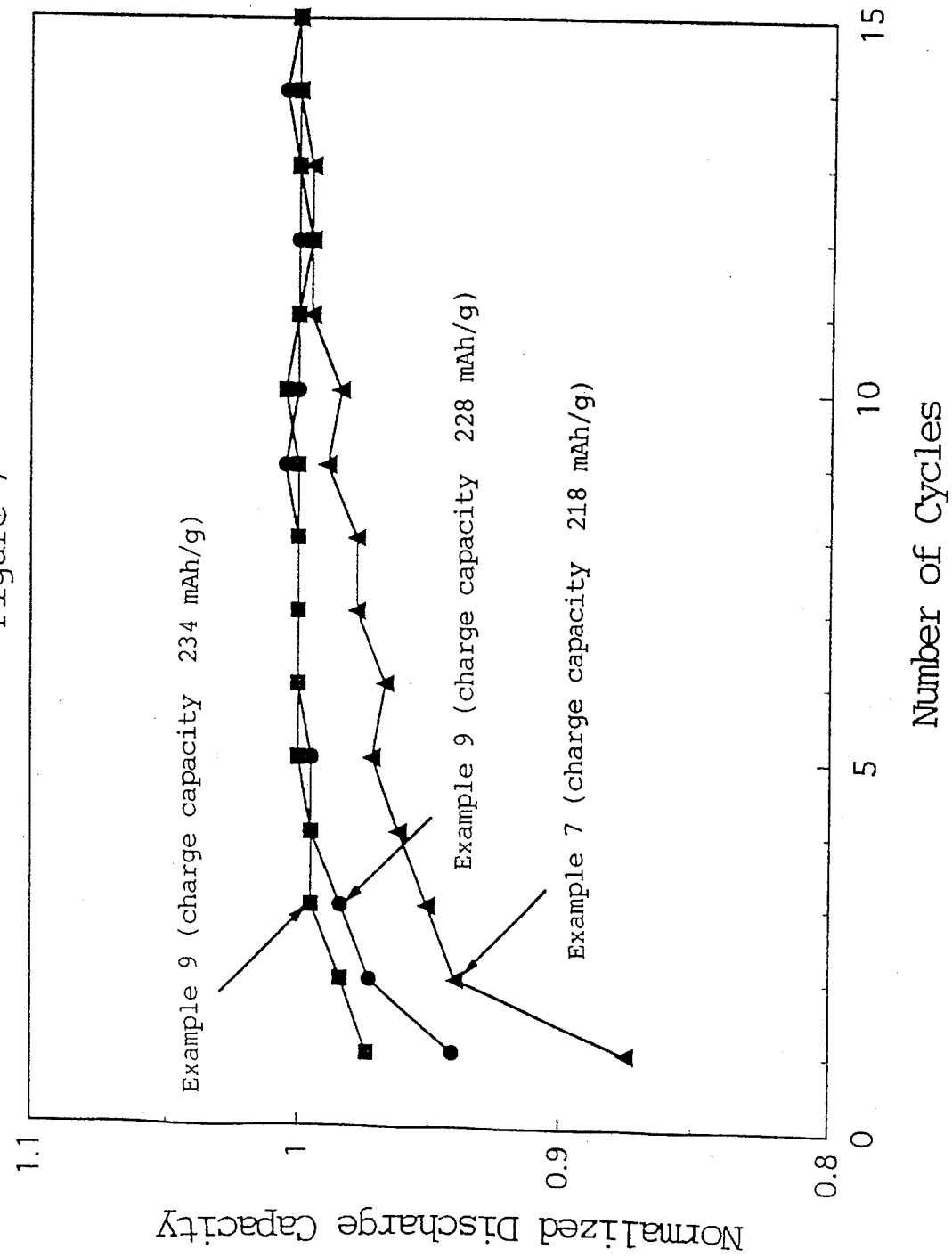
FIG. 7 is a graph showing the variation with cycles of the discharge capacities of lithium secondary batteries of several examples.

The variation of the discharge capacity up to the 15th cycle is shown in FIG. 7. In this graph, the capacity is normalized for comparison by using the capacity in the 15th cycle as 1. When the discharge capacity was 220mAh/g or more, discharge capacity rose at an improved speed. Specifically, it was found that the discharge capacity rose by approximately the 5th cycle.

Thus, when the charge capacity at the time of the production of a battery is set to be 220 mAh/g or more per weight of lithiated nickel dioxide containing gallium, the initial overvoltage can be decreased and the discharge capacity rises at an increased speed.

Although the battery was charged at 220 mAh/g or more only once in the 1st cycle in this example, the battery can be charged twice or more in the 2nd or a later cycle.

As described above, the present lithium secondary battery has excellent cycle characteristics and overcharge resistance even when charged/discharged at a high capacity, and can attain a high energy density, because it exhibits a high discharging voltage. Accordingly, the present lithium secondary battery is extremely valuable in industry.

EXAMPLE 10

An electrode and a plate battery for a charging/discharging test were manufactured as follow:

To a mixture of the powder obtained in Example 1, as an active material; and an artificial flaky graphite (KS15 manufactured by Ronza Co., Ltd.), as a conductive substance; was added an NMP solution including PVDF, as a binder; so as to attain a composition ratio among the active material, the conductive substance and the binder of 87:10:3 (weight ratio). The resulting solution was kneaded to obtain a paste.

The paste was coated on one surface of an aluminum foil, 20 μm thick, and vacuum-dried at 150 ° C. for 8 hours and pressed to obtain a sheet. Then, the sheet was cut to obtain a cathode measuring 1.3 cm×1.8 in size.

Natural graphite powder (occurrence: Madagascar), which was heat-treated at 3000 ° C., and has a number-average particle size of 10 μm, a specific surface area of 9 m$_2$/g according to a nitrogen adsorption method, a true specific gravity of 2.26, an interlayer spacing $d_{002}$ of 3.36 Å in X-ray diffraction, and an ash content of 0.05% by weight; was mixed with graphitic carbon black (TB3800 manufactured by Tokai Carbon Co., Ltd.), and subjected to graphitization at 2800° C. so as to attain a composition ratio among the natural graphite powder and the carbon black powder of 95:5 (weight ratio).

One part by weight of a silane coupling agent (A186 manufactured by Nippon Unicar Co., Ltd.) was added to the mixture. After sufficiently mixing them, the mixture was vacuum-dried at 150° C. to obtain mixed graphite powder treated with the silane coupling agent.

Then, to the mixed graphite powder treated with the silane coupling agent was added an NMP solution, including PVDF as a binder, so as to attain a composition ratio of the mixed graphite powder treated with the silane coupling agent and the binder of 97:3 (weight ratio). The resultant solution was kneaded to obtain a paste. The paste was coated on one surface of copper foil, 10 μm thick, and vacuum-dried at 150° C. for 8 hours and pressed to obtain a sheet. Then, the sheet was cut to obtain an anode 1.5 cm×2 cm size in size.

By using the thus obtained cathode and anode, a plate battery was manufactured together with a liquid electrolyte (1M LiPF$_6$/EC+DMC+EMC) and a polypropylene microporous membrane as a separator.

The plate battery obtained above was subjected to a charging/discharging test using a constant current and voltage, and discharge by a constant current under the following condition:

Maximum charging voltage: 4.2 V

Charging time: 1 hour

Charging current: 7.7 mA

Minimum discharging voltage: 2.75 V

Discharging current: 7.7 mA

The potential of the cathode of the present battery went above 4.2 V (vs. Li/Li$^+$) at the last stage of charging under the experimental conditions owing to the mixed graphite powder treated with the silane coupling agent as an anode active material.

The discharge capacity of the 1st, 10th, 11th and 20th cycles were 3.67, 3.79, 3.86 and 3.76 mAh, respectively. The capacity holding ratios R1 and R2 were 1,032 and 0.967, respectively, and thus, the battery exhibited excellent cycle characteristics.

What is claimed is:

1. A lithium secondary battery comprising:

a cathode including, as an active material, a material that can be doped/undoped with lithium ions;

an anode including, as an active material, a lithium metal, a lithium alloy or a material that can be doped/undoped with lithium ions; and a liquid or solid electrolyte, wherein said active material in said cathode is lithiated nickel dioxide containing gallium.

2. A lithium secondary battery according to claim 1, wherein said lithiated nickel dioxide containing gallium satisfies the following relationship:

$0 < x \leq 0.2$ wherein x is a molar ratio of the gallium to a total amount of the gallium and nickel contained in said lithiated nickel dioxide.

3. A lithium secondary battery according to claim 1, wherein said lithiated nickel dioxide containing gallium satisfies the following relationship:

$$0 < x \leq 0.05$$

wherein x is a molar ratio of the gallium to a total amount of the gallium and nickel contained in said lithiated nickel dioxide.

4. A lithium secondary battery according to claim 1, wherein said lithiated nickel dioxide containing gallium satisfies the following relationship:

$$0.001 < x \leq 0.02$$

wherein x is a molar ratio of the gallium to a total amount of the gallium and nickel contained in said lithiated nickel dioxide.

5. A lithium secondary battery according to claim 1, wherein said lithiated nickel dioxide containing gallium is obtained by firing a mixture of a lithium compound, a nickel compound, and gallium or a gallium compound.

6. A lithium secondary battery according to claim 1, wherein said lithiated nickel dioxide containing gallium is obtained by dispersing a nickel compound in an aqueous solution including a gallium compound and a water-soluble lithium salt, evaporating a water content of the resultant solution to obtain a mixture, and firing the mixture in an atmosphere containing oxygen.

7. A lithium secondary battery according to claim 6, wherein said gallium compound is gallium nitrate, said water-soluble lithium salt is lithium nitrate and said nickel compound is basic nickel carbonate.

8. A lithium secondary battery according to claim 1, wherein said lithiated nickel dioxide containing gallium is obtained by adding a basic compound to an aqueous solution of gallium nitrate to attain a pH of 10 or more, dissolving lithium nitrate in the resultant solution, adding basic nickel carbonate thereto, then evaporating a water content of the solution to obtain a mixture, and firing the mixture in an atmosphere containing oxygen.

9. A lithium secondary battery according to claim 8, wherein said basic compound is lithium hydroxide.

10. A lithium secondary battery according to claim 1, wherein said lithiated nickel dioxide containing gallium has a crystallite size of 700 angstrom or less determined through X-ray powder diffraction.

11. A lithium secondary battery according to claim 1, wherein said lithium secondary battery is charged at least once at 220 mAh/g or more per weight, at the time of the production thereof, of said lithiated nickel dioxide containing gallium.

12. A lithium secondary battery according to claim 1, wherein said anode includes graphite as a sole component or a main component of an active material, and said liquid electrolyte comprises ethylene carbonate, dimethyl carbonate and ethyl methyl carbonate.

* * * * *